Oct. 31, 1939.  H. W. JONES ET AL  2,178,451
TUBE WELDING PROCESS AND APPARATUS
Filed Nov. 14, 1936  5 Sheets-Sheet 1
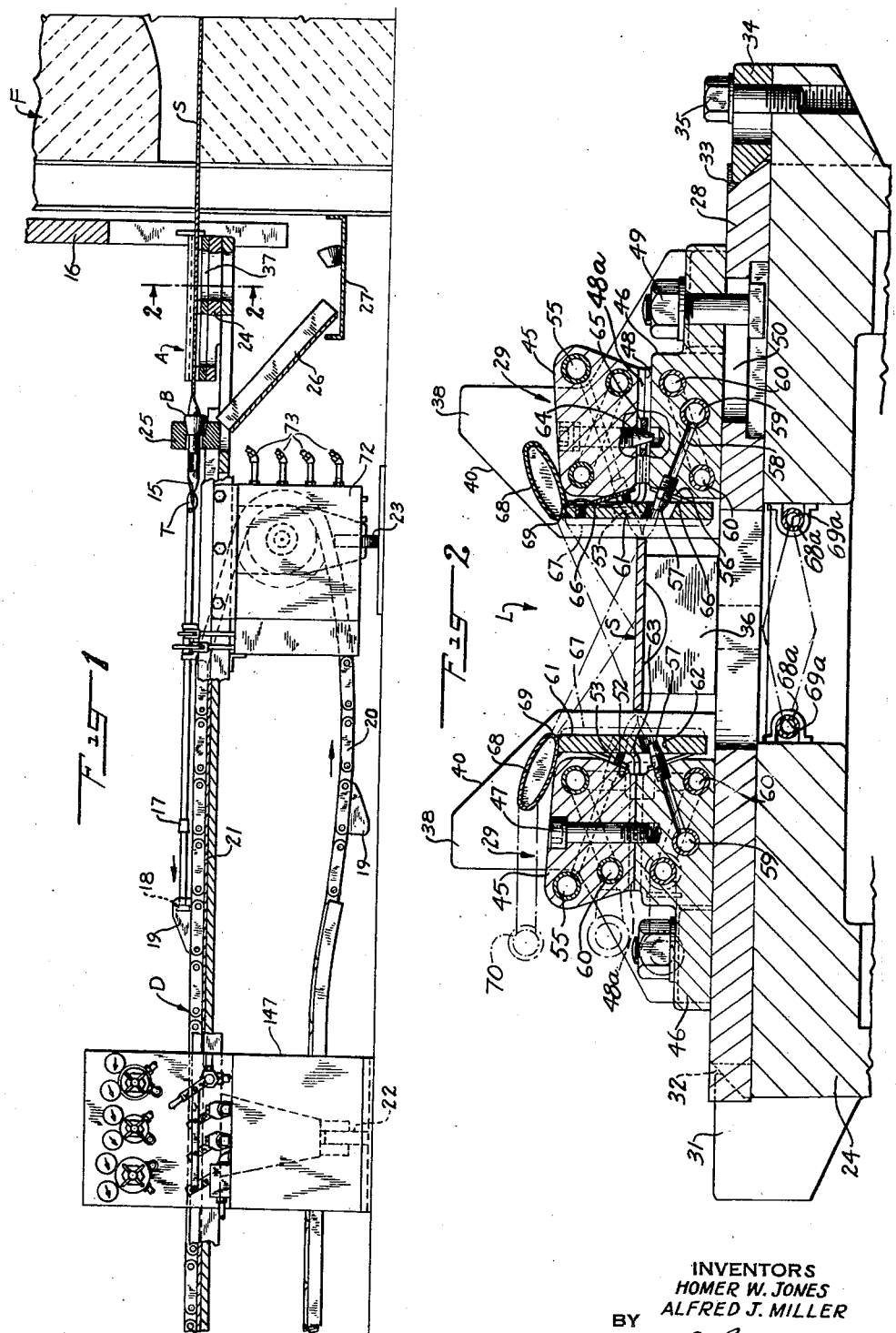
INVENTORS
HOMER W. JONES
ALFRED J. MILLER
BY
EL Greenewald
ATTORNEY

INVENTORS
HOMER W. JONES
ALFRED J. MILLER

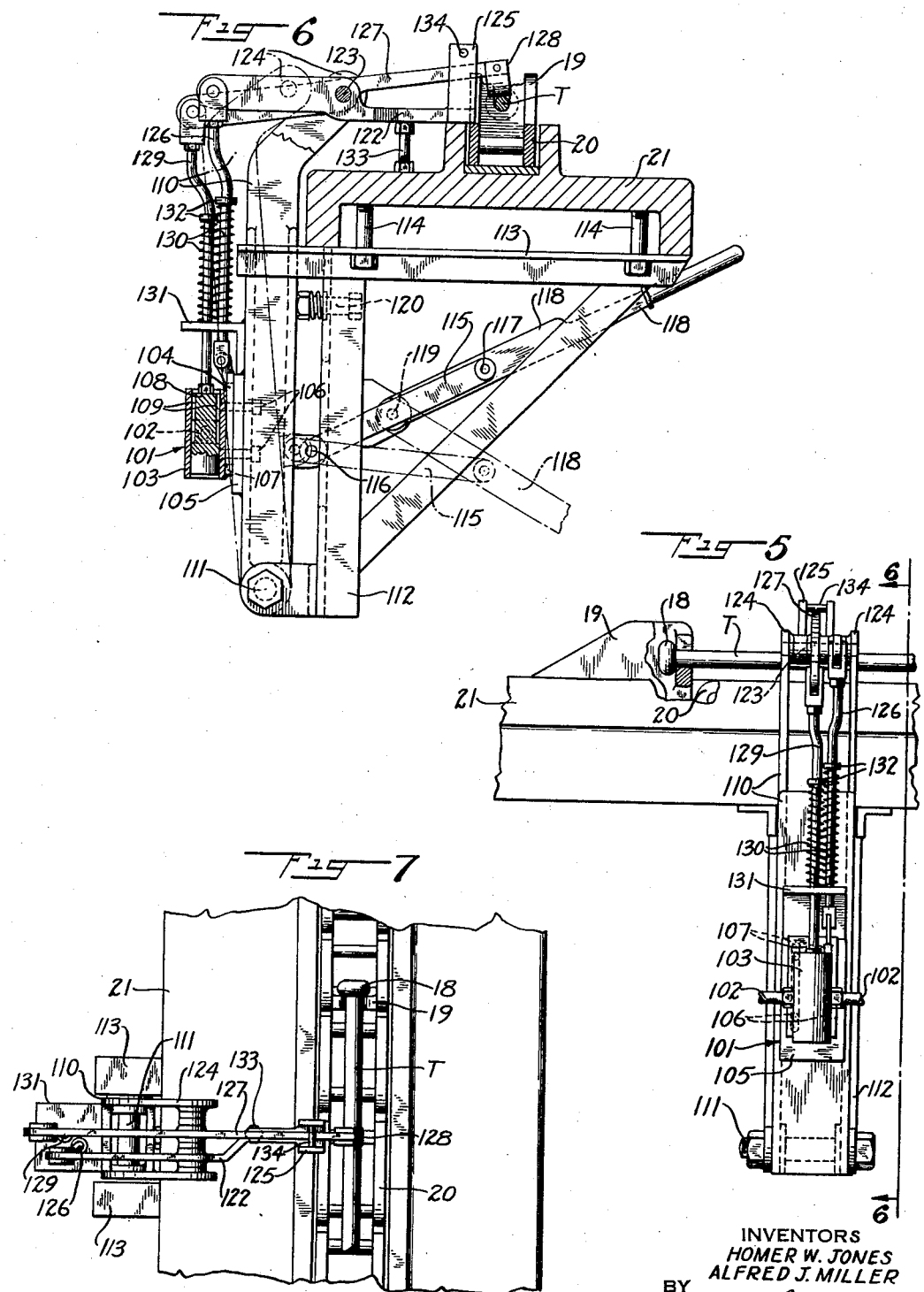

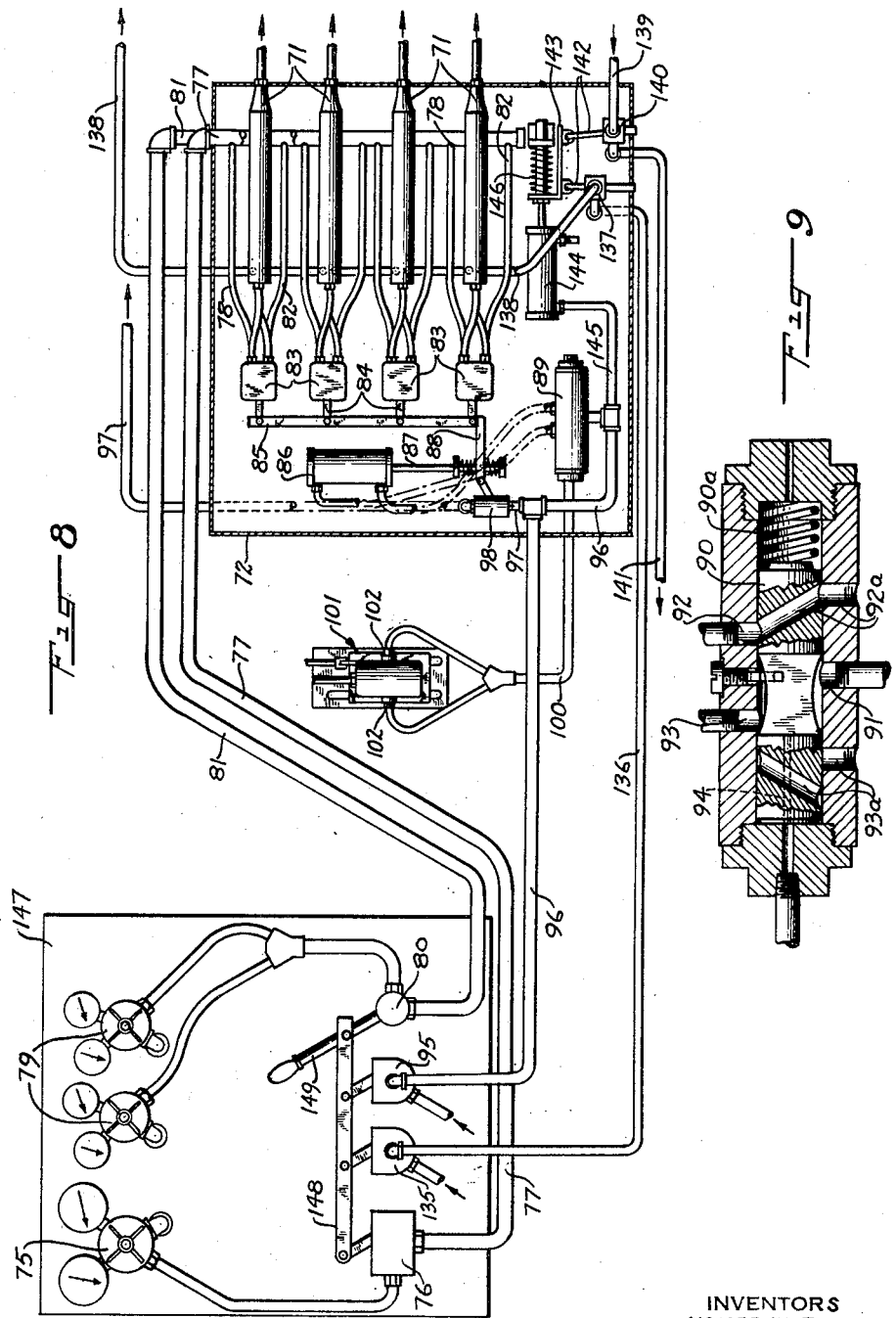

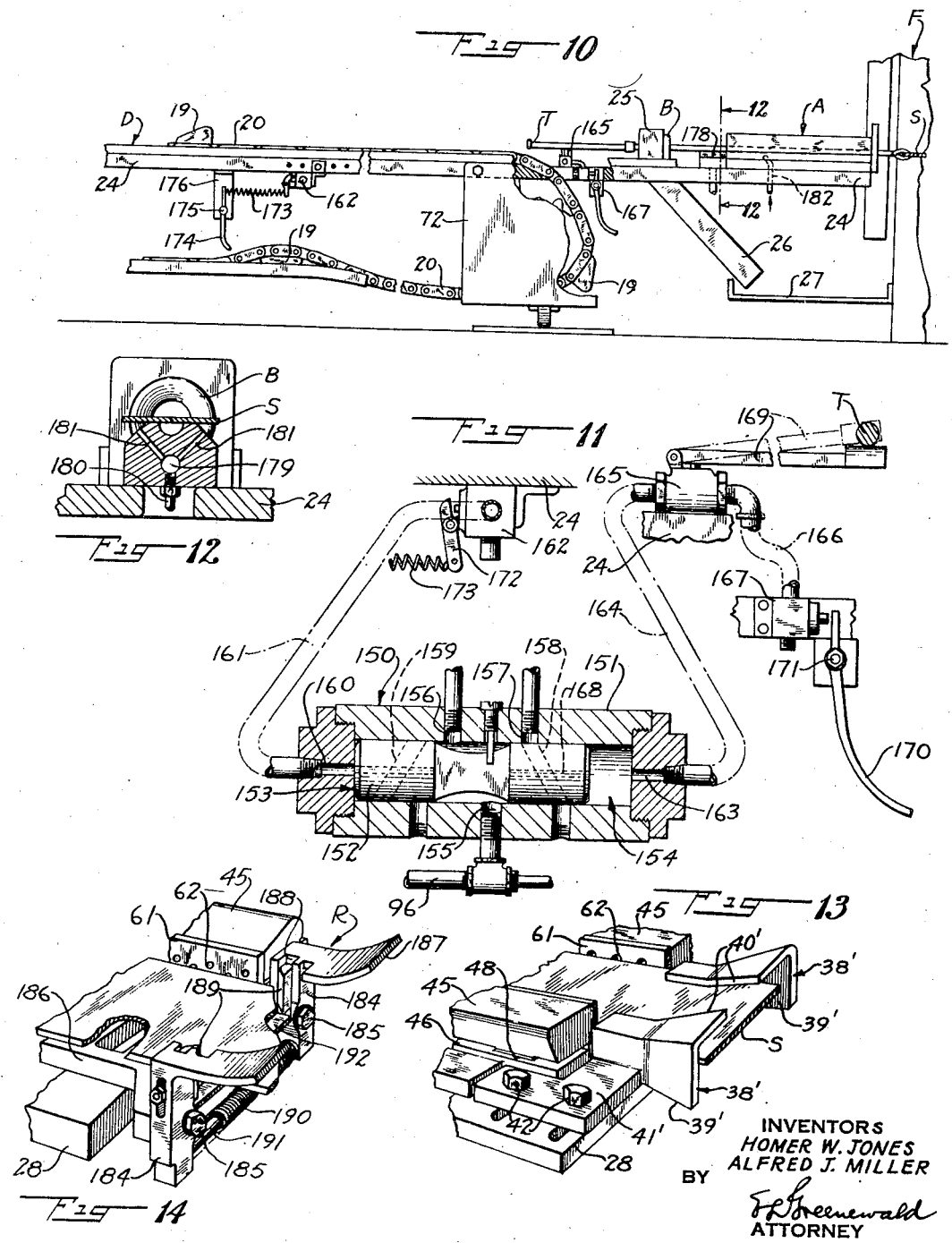

Patented Oct. 31, 1939

2,178,451

UNITED STATES PATENT OFFICE 2,178,451

TUBE WELDING PROCESS AND APPARATUS

Homer W. Jones, Westfield, and Alfred J. Miller, Cranford, N. J., assignors to Oxweld Acetylene Company, a corporation of West Virginia Application November 14, 1936, Serial No. 110,862

39 Claims. (Cl. 205—9)

This invention relates to the art of tube welding, and particularly to a process and apparatus for heating the lateral edges of skelp or flat strip material prior to passing such material through a tube forming and welding die.

In the manufacture of butt welded pipe or tubing from flat strip material, it is necessary to heat the edges of the material to welding temperature and to heat the body to a temperature where it will be readily pliable so that the tubing may be easily shaped and the edges firmly united. One method of manufacture commonly employed comprises heating the entire skelp or strip material to the welding temperature in a suitable furnace and then drawing the heated material through a forming and welding die which shapes the strip into tubular form and forces the edges together under pressure. However, when the entire skelp is heated to the welding temperature it is usually very soft and the pipe or skelp may tear or break apart under the tension exerted in drawing it through the forming and welding die. In order to overcome this difficulty, numerous proposals have been made for supplying additional heat to the lateral edges of the strip material, after it is withdrawn from the furnace and before it is passed through the forming and welding means. When additional heat is supplied to the edges before welding, the furnace temperature need only be maintained sufficiently high to render the material pliable.

According to such proposals, butt welded tubing is manufactured in approximately twenty foot lengths, in varying sizes up to three inches in diameter. The flat strips of cold material are fed into a suitable furnace by means of a charging machine and are heated to approximately 2400° F. When the draw-bench bell-weld method of welding is employed, the strips, when properly heated, are removed one at a time from the opposite end of the furnace where they are passed through the auxiliary edge heating devices and the forming and welding die. Thus, the welder removes a single skelp when it is at the welding temperature by grasping the end of it with a pair of slender tongs over which a forming bell has been placed. The tongs are then hooked to an endless travelling chain on the draw-bench which pulls the tongs, bell, and skelp simultaneously from the furnace. The bell is caught and supported against a head block adjacent the auxiliary heating apparatus, and the tongs followed by the skelp are drawn through the opening in the bell to bend or curl the skelp and thus force the edges of the strip material together under pressure and unite them firmly. The hot tubing is then run through sizing rolls which give it the correct outside diameter, after which it is cooled, cut to length and threaded on the ends if desired.

When small sized skelp is being formed into tubing, approximately 800 to 1000 lengths are welded in an hour. In proceeding with such rapidity, numerous difficulties may be encountered, i. e., a skelp may become stuck or caught as it is passing through the spaced auxiliary heating lanes just outside the furnace, or a skelp may not feed properly through the forming and welding die. When either of these conditions occurs, it is necessary to cease operation temporarily to remove the defective skelp. This means that the skelp remaining in the furnace is liable to become greatly overheated and unfit for use unless the defective skelp can be removed quickly so that operations may be continued with the least possible delay.

Apparatus heretofore devised for supplying auxiliary heat to the lateral edges of skelp as it is passing from the furnace to the welding and forming die apparently has made no provision for these difficulties. Nor has any provision been made for preventing the accumulation of slag or cinder around the flame orifices or effecting its quick removal; for preventing the flames from the auxiliary heating devices from interfering with the work of the operator; for adjusting the auxiliary heating apparatus to allow it to be employed with skelp of varying widths and thicknesses and still efficiently heat the lateral edges thereof; or for varying the amount of heat and controlling it automatically at all times with no additional effort on the part of the operator.

One of the principal objects of the present invention is to provide an improved process and apparatus for efficiently heating the lateral edges of skelp, which will not be subject to the above mentioned difficulties or disadvantages, and by means of which the temperature of skelp edges for any size of tube can be sufficiently raised so as to secure more effective welds in commercial tubing than is possible with apparatus heretofore devised for this purpose. Another object is to provide an improved process and apparatus especially useful for welding tubing composed of high carbon or special alloy steels. Other and more specific objects are to provide: a heating unit which may quickly and conveniently be adjusted to handle skelp of varying widths and thicknesses; means for protecting the heating tips or orifices from the accumulation of slag; means for preventing the secondary envelope flames from rising or spreading and hindering the operator; a construction permitting quick removal of any skelp which may become stuck between the spaced lanes of the auxiliary heating device or within the forming and welding bell, and for simultaneously shutting off the gas supply during such removal; and automatically operating devices for shutting off and turning on the heating gases between successive passings of the skelp through the heating unit, and for controlling the supply and interruption of the cooling and other fluids.

The above and other objects and novel features of the present invention will become apparent in the following description, having reference to the accompanying drawings, in which:

Fig. 1 is a fragmentary side elevational view, partly in section, of a bell-welding apparatus embodying the principles of the present invention;

Fig. 2 is an enlarged vertical sectional view taken substantially along the line 2—2 of Fig. 1 and showing certain of the details of the auxiliary skelp edge heating device;

Figure 3:
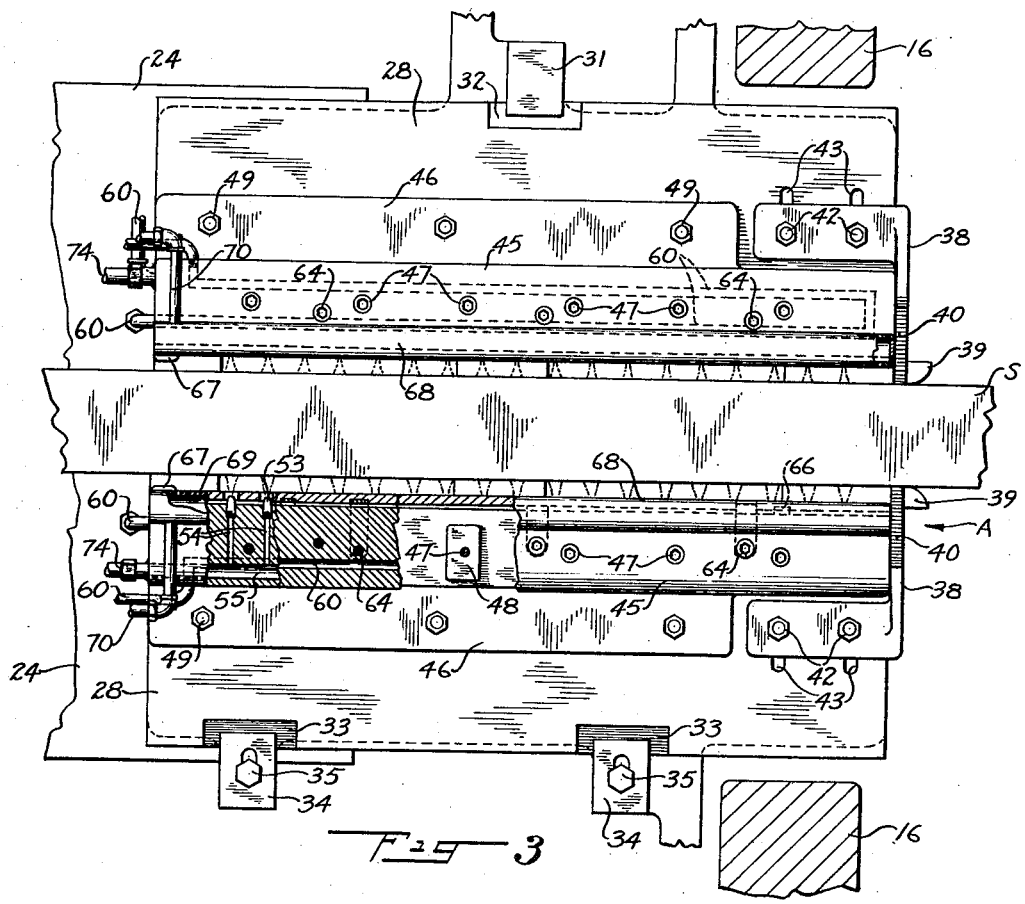
Fig. 3 is a fragmentary plan view, partly in section, of the auxiliary skelp edge heating apparatus.

Figs. 5, 6, and 7 are, respectively, side elevational, front elevational, and plan views, partly in section, of a portion of the apparatus shown in Fig. 1 and showing parts of the automatic gas controlling mechanism;

Fig. 8 is an elevational view, mainly diagrammatic, showing the conduit connections between the benchman's control panel and the control box for the heating gas, cooling water and compressed air supplies;

Fig. 9 is a detail vertical sectional view of the remote control valve for the air cylinder controlling the heating gas supply valves;

Fig. 10 is a fragmentary side elevational view, partly in section, of an apparatus similar to that shown in Fig. 1 but employing a modified form of automatic gas controlling mechanism;

Fig. 11 is an enlarged elevational view and diagrammatic arrangement, partly in section, of a portion of the apparatus shown in Fig. 10 and showing a modified remote control valve and its operating mechanism;

Fig. 12 is a fragmentary vertical sectional view taken along the line 12—12 of Fig. 10 and showing an additional air blast for removing cinder from the underside of the heated skelp before it passes through the forming and welding bell;

Fig. 13 is a fragmentary perspective view of a modified form of lateral edge guide which may be used with the auxiliary heating unit; and Fig. 14 is a fragmentary perspective view of a combined scraper and lateral edge guide which may be used in conjunction with the auxiliary heating unit, especially when welding skelp composed of high carbon or special alloy steels.

The features of the present invention have been shown applied to, or used in conjunction with, the well known bell-welding draw-bench apparatus, though it is to be understood that the invention is not limited in its application to this particular type of tube welding machine, and that certain features of the invention are applicable in welding apparatus generally.

Referring to the drawings, and particularly to Fig. 1, it will be seen that the skelp or flat strips of material S having bent-up ends 15 may be given a primary heating to a temperature of approximately 2400° F. in a suitable skelp heating furnace F which is provided with a water cooled discharge door 16. The cold strips of material are inserted into the furnace F through a charging door (not shown) in the side opposite the door 16, and lie upon the hearth level of the furnace until they have been heated to the proper temperature. When this temperature is reached, the bent-up end 15 of one of the heated skelps is grasped with a pair of tongs T over which a bell or circular forming and welding die B has been placed. The tongs are then closed so as to grip the end of the heated skelp and are held in clamping relation by means of a clamping ring 17 which is adapted to slide upon the tongs. The skelp may be withdrawn from the furnace by engaging a lug 18 on the free end of the tongs with one of a series of dogs or hooks 19 provided on an endless draw-chain 20 which may be given a constant motion over the usual draw-bench plate or table surface 21 in any suitable manner. The draw-bench is pivotally mounted at the left hand end thereof (not shown) so that it may be moved upon rollers 22 and 23 to any desired radial position in front of the furnace F.

As the heated skelp is drawn or moved from the furnace in this manner, the exposed lateral edges thereof are thermo-chemically treated by passage through a heating lane L provided in a weld preparation station comprising an auxiliary heating unit A which is positioned directly adjacent the furnace opening and is mounted upon an extension or support 24 of the draw-bench plate 21. During passage through the auxiliary heating unit A the exposed lateral edges of the skelp S, which edges have sides of finite width, are heated to the welding temperature while the bell B has become engaged in a head block 25 provided for that purpose. Thus, as the skelp continues moving it will be drawn through the bell B so that the highly heated lateral edges will be forced together under pressure to provide a firm and uniform weld. When the entire length of skelp has been drawn through the welding bell B, said bell will drop from the head block 25 into a chute 26 which leads to a bell trough 27 from which the bells may be removed by an attendant for cooling and cleaning.

Having thus described the general set-up and operation of the draw-bench bell-weld apparatus, the novel method and apparatus for supplying additional heat to the skelp edges will now be described.

In accordance with the present invention, the lateral edges of the flat strip material may be effectively heated, during the movement of said strip material in a direction substantially parallel to said edges, by means of spaced lanes of flames composed of a mixture of oxygen and fuel gas, such as acetylene, butane, propane or the like. When such a flame is employed, the intensive heat of the inner cone of the flame will quickly raise the lateral edges of the strip or skelp to the welding temperature so that they may be firmly united upon passing through the welding die. Simultaneously, the envelope gases which are present in the flame and are actively reducing in their nature, wash over the surfaces of the skelp and aid in the removal of oxides. Such a heating of the edges is accomplished by means of the auxiliary heating unit.

As pointed out above and shown in Fig. 1, the auxiliary heating unit A occupies the space between the furnace discharge opening and the forming and welding die or bell B so that the furnace heated skelp S will pass immediately from the furnace through said heating unit without being exposed unduly to the atmosphere. This auxiliary heating unit comprises a base 28 upon which are mounted two heating heads 29 which are spaced to provide the lane L through which a heated skelp may pass. The base 28 is removably mounted upon the extension 24 of the draw-bench plate by means of an inwardly bent lug 31 which engages in a notch 32 provided in the central portion of the left hand edge of the base; while the right hand side of the base is provided with a pair of similar notches 33 which are engaged by slotted locking members 34 secured to the draw-bench extension 24 by means of headed screws 35. Thus, by loosening the screws 35 the slotted locking members may be moved out of engaging relation with the base 28 so that the entire heating unit may be readily removed, if desired. Such removal of the heating unit may be desirable to repair or replace it, or in order to allow the substitution of another integral unit to facilitate a change in the production sizes of tube. If desired, an auxiliary heating unit for each size of tube may be kept available and installed at any time desired in but a fraction of the time required for the necessary changes in the mill setup.

While the heated skelp S is passing between the spaced heating heads 29 and in the lane L, it may be supported upon a plurality of notched supporting members 36 which rest upon the base plate 28 and which are of such height as to position the skelp properly with respect to the heating heads 29. In Fig. 1 it will be observed that openings 37 are provided in the base plate 28, between the supporting members 36, to allow the cinder or molten slag to fall through and into the bell chute 26 and trough 27 and thereby keep the heating heads as clean as possible and prevent the accumulation of slag around them. Lateral edge guide plates 38 having curved or flaring entrance flanges 39, as shown in Fig. 3, may be provided at the entrance to the heating heads 29 for the purpose of positioning the edges of the skelp laterally with respect to said heating head. These guides may be of any suitable construction and, as shown, comprise vertically disposed plates having sloping upper edges 40 and inwardly bent flanges 41 by means of which the guides may be adjustably secured to the base plate 28 by bolts 42 engaging in slots 43 provided in said base plate. The sloping upper edges 40 of the guides may be utilized to guide or direct the tongs as they are dropped between the heating heads, and the notches in the supporting members 36 provide a resting place for the tongs after their insertion in the furnace for removing the heated skelp.

In Fig. 13 there is shown a modified form of lateral edge guide 38' which is adapted to perform the additional function of holding the skelp down upon the supporting members 36 as it passes through the lane L of the auxiliary heating unit. Such guides may be provided with curved or flaring entrance flanges 39' and horizontally disposed guiding portions or flanges 40' which are arranged to overlap the edges of the skelp. These flanges 40' may be flared or curved upwardly as shown so that with the flanges 39' they form a chute-like entrance to the auxiliary heating unit A through which the heated skelp may be drawn. Attaching portions 41' are also provided and the guides may be adjustably secured to the base plate 28 by means of the bolts 42, similarly to the guides 38. It will be noted that although suitable clearance is provided, either of the lateral edge guides 38 or 38' is adapted to scrape any protruding or abnormal formations of slag or oxide from the edge of the skelp before it enters the heating lane L.

Figure 4:
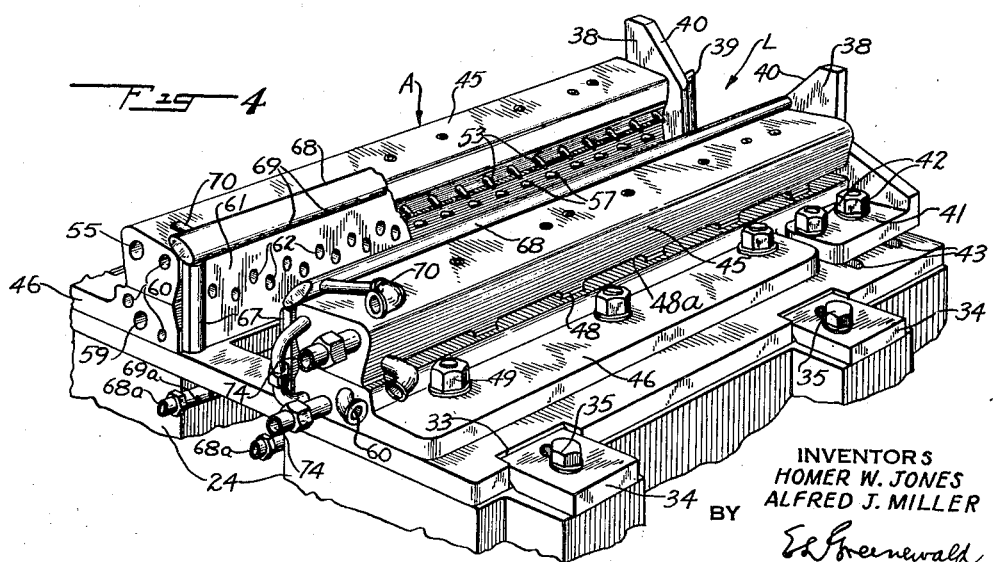
Fig. 4 is a fragmentary perspective view of the apparatus shown in Fig. 3.

Each of the heating heads 29 comprises an upper section 45 secured to a lower section 46 by means of bolts 47, said sections 45 and 46 being provided with cooperating ribs or flanges 48 on their adjoining faces so as to form air channels or slots 48a between the two sections as clearly shown in Fig. 4. The lower heating section 46 is adjustably mounted upon the base 28 by means of headed bolts 49 which cooperate with slots 50 provided in the base member 28. By loosening the bolts 49 the entire heating unit or head may be moved laterally upon the base member 28 so as to adjust the heating unit for skelp of various widths.

Each of the upper heating head sections is provided with a downwardly and outwardly sloping face 52 on the side facing the lane L, and a plurality of heating tips 53 are mounted in the head section at spaced intervals along such sloping face. The burner or heating tips 53 are conventional blowpipe tips and each is connected by a transverse passage 54 with a main longitudinal gas supply passage 55 in the upper portion of the head. Likewise, the lower sections 46 of the heating heads are provided with upwardly and outwardly sloping faces 56 which oppose the faces 52 in each heating head and have mounted therein a plurality of burner tips 57. The tips 57 of each lower section are connected by transverse passages 58 with a longitudinal gas supply passage 59 in the lower portion of the section. As shown in Fig. 4, the tips 53 in the upper section occupy a staggered relation with respect to the tips 57 in the lower section, and the slopes of the faces 52 and 56 are such that the flames issuing from the burner tips or flame orifices will converge toward and be directed upon the lateral edges of the skelp as it moves along the supports 36. Thus, the rows or series of heating jets which are provided along each side of the skelp, are disposed in two inclined planes which converge toward and/or intersect approximately at the edges of the skelp or other common surface of workpieces moving in the predetermined path through the weld preparation station. Such an arrangement will concentrate the heat directly on the longitudinal center line or region of the skelp edges and thereby result in greater efficiency in the use of the heat.

It will be noted, moreover, that by loosening the bolts 47 and inserting spacers or shims between the upper and lower sections the distance between the rows of heating tips in the heating heads may be adjusted to accommodate skelp of varying thicknesses and still efficiently heat the lateral edges thereof. Furthermore, the slots 48a between the upper and lower sections of the heating heads provide access for atmospheric oxygen and thereby reduce the amount of pure oxygen required for proper combustion. This feature of construction, combined with the convergent relation of the heating jets permits air, or other suitable combustion supporting gas, to be supplied between the converging jets, and directed substantially at their point of intersection where it will be most effective in aiding in combustion and thereby further increase the efficiency of the heating. Such air admitted through the slots 48a also aids in cooling the burner tips. However, the head sections themselves may be further cooled by circulating water through cooling passages 60 provided therein.

If it should be desired to cut down on the amount of heat supplied to the lateral edges of the skelp, it will be apparent that alternate tips may be removed from the heating head sections and their corresponding passages plugged. Such adjustments of the heating supply may be desirable when varying the size of skelp, for it will be understood that the amount of heat supplied should be correlated with the speed of travel of the skelp and the thickness thereof. Otherwise, the edges might be heated to such a degree as to cause a melting of the skelp with resultant flaws and imperfections in the weld.

In order to protect the burner tips 53 and 57 from the accumulation of slag and cinder, a protective plate 61 may be provided over the face of each of the heating heads. These plates, which may be water cooled if desired, are made of copper or other suitable material to which the molten slag will not adhere and, as shown in Figs. 2 and 4, are provided with properly spaced and staggered openings 62 for the reception of the burner tips. The apertures or openings 62 are sufficiently large to allow the atmospheric air entering from the space between the upper and lower head sections to pass readily around the tips to support the secondary combustion. The plates 61 are removably mounted against the faces of the heating heads in any convenient manner, such as by means of brackets 63 which are adapted to fit into the slots 48a between the upper and lower sections of the heating heads, and are engaged by screws or pins 64 cooperating with openings 65 provided in the ends of the brackets. It may also be desirable to space the protective plates 61 at a slight distance from the faces of the heating heads, so as to allow a further influx of atmospheric air and circulation thereof about the tips and the faces of the heating heads. This may be effectively accomplished by means of outwardly bent supporting arms 66 which bear against the inclined faces 52 and 56 of the upper and lower sections of the heating heads and act as a resilient supporting means for the protective plates. It will thus be apparent that any slag which may be thrown to the sides as the heated skelp is passing between the heating heads may be readily scraped or cleaned from the protective plates 61 without interfering with the heating tips. Moreover, if any of the openings 62 should become clogged with slag or cinder, the plates may be easily removed for thorough cleaning by raising the pins 64. It will also be apparent that the tips 53 and 57 may be removed for cleaning.

In Figs. 2 and 4 and Fig. 13 it will be observed that the adjustable guides 38 or 38' will prevent the heated skelp from contacting the copper plates 61 at the entrance end of the heating unit. The opposite ends of the protective plates 61 may be similarly protected from direct contact with the heated skelp by providing a guide strip 67 (Fig. 4) which may be composed of or coated with any suitable wear-resistant alloy.

When a mixture of oxygen and fuel gas, preferably acetylene, is supplied to the heating heads, the pressures of the gases may be adjusted in a well known manner so as to provide the usual efficient and intensive heating flame which is directed upon the lateral edges of the skelp as described above. The secondary flames of combustion of the oxygen and fuel gas, though they are actively reducing and perform the useful function of deoxidizing the surfaces and edges of the skelp as they pass thereover, are nevertheless voluminous and tend to rise and spread considerably above the heating unit and thus cause a definite interference with the welding operation. In order to prevent or reduce the rising of the secondary or envelope flames, it has been found desirable to provide air blast tubes 68 adjacent each heating head for directing cooperating sheets of air or other suitable gas preferably inert down upon the travelling skelp. As shown in Fig. 4, these tubes are elliptical in cross section and may be conveniently mounted by welding upon the upper edges of the plates 61. A plurality of orifices 69 are provided along the inner edges of these elliptical tubes and compressed air may be supplied thereto through inlet pipes 70. Air emitted from the closely spaced orifices 69 flows downwardly toward the skelp in the form of two intersecting sheet-like blasts which tend to keep the secondary flames from rising and also reduce such flames by providing oxygen for their consumption. Thus, it will be apparent that these air blast tubes constitute a means for applying an air envelope or protective dense blanket of air in sufficient proximity to the top side of the skelp to inhibit the rise of the flames.

Should it be found that the envelope flames passing from the underside of the skelp through the openings 37 likewise interfere with the welding operation, such a spreading may also be prevented or reduced by providing air blast tubes 68a below the auxiliary heating unit A. As shown in Fig. 2, such tubes may be be secured to the underpart of the draw-bench plate extension 24 in any suitable manner and may be provided with orifices 69a which are arranged to direct cooperating sheet-like blasts of air across the openings 37. It will be understood that the air blasts from the tubes 68a together with blasts from the tubes 68 will prevent and/or reduce the spread of the envelope flames both below and above the auxiliary heating unit and also aid in confining the heat in the region of the skelp.

Provision has been made for controlling, both automatically and manually, the mixture of gases for the heating heads, the air supplied for the tubes 68 and 68a, and the cooling water which circulates through the heating heads. The systems for effecting these controls will now be described.

Referring to Fig. 8, it will be seen that mixing means, such as four blowpipes 71 are suitably mounted in a control box 72 which may be secured in any convenient position adjacent the draw-bench D. One blowpipe is provided for each section of the heating heads 29 and is connected to the main longitudinal passage 55 or 59 therein by means of suitable flexible tubing 73 (Fig. 1) and fittings 74 (Fig. 4). It is the function of the blow-pipes, which are of conventional construction, to mix the oxygen and fuel gas and supply a properly proportioned combustible mixture to the burner tips in each section of the heating heads. Oxygen is furnished from a suitable source of supply under the control of the usual regulators 75 and passes through a manually controlled valve 76 into a manifold 77, and thence through conduits 78 to the blowpipes 71. Likewise, acetylene is derived from a suitable source of supply under control of one or more regulators 79 and passes through a manually controlled valve 80 into a manifold 81, and through conduits 82 to the blowpipes.

It will be apparent that with the regulators 75 and 79 and the manually operated valves 76 and 80, the supply of gas to the heating heads may be properly controlled by hand. It has been found, however, that a material saving in the gas consumption may be effected by providing automatic controls by means of which the heating gas will only be supplied when a skelp is passing between the heating heads.

To give such a desired and further control of the gases, each blowpipe 71 is provided with a duplex control valve 83 which may be mounted adjacent thereto in the control box 72. The operating handle 84 of each of the duplex valves 83 is pivotally connected to a control bar 85 which is adapted to open or close all of these valves simultaneously. Movement of the control bar 85 is directly effected by means of an air cylinder 86 having a piston rod 87 which is operatively connected to an arm 88 provided on the control bar 85. The movement of the air cylinder piston is in turn controlled by a remote control valve 89 which may also be mounted in the box 72.

As shown in Fig. 9, this remote control valve is provided with a double ended piston or plunger 90 within the casing thereof, which piston is continuously urged toward the left by means of a helical spring 90a. Fluid under pressure may be supplied to the valve 89 through an inlet port 91 and, depending on the position of the piston 90, will pass through an outlet port 92 to the lower side of the air cylinder 86 to thereby hold the piston in its upper position and maintain the duplex valve closed; or through an outlet port 93 to the upper side of said air cylinder to move the air cylinder piston downwardly and open the duplex valves 83. When the remote control valve is under pressure, fluid will pass through a small bleeder passage 94 provided in the plunger 90 and exert pressure on the left hand end of said plunger causing it to move to the right and compress the spring 90a. With the plunger in this position, fluid will be admitted to the lower side of the air cylinder through outlet 92, causing the air cylinder piston to move upwardly, thereby forcing the fluid above said piston through outlet port 93 and an exhaust passage 93a registering therewith. If, however, the pressure should be released on the left hand side of the plunger 90, the spring 90a will move the plunger to the position shown in Fig. 9 where the fluid would pass from the inlet 91 to the upper side of the air cylinder through the outlet 93. At such time the air cylinder piston will move downwardly forcing the fluid below it through the outlet port 92 and a suitable exhaust passage 92a registering therewith, and the duplex valves will be moved to open position.

Compressed air may be supplied to the remote control valve 89 and its associated air cylinder 86 from any convenient source, and, as indicated in Fig. 8, passes through a manually operated valve 95 and into a conduit 96 leading to the inlet port 91 of said remote control valve. A conduit 97 joined to the conduit 96 and having a valve 98 therein is utilized to conduct the air under pressure to the tubes 68 and 68a on the heating heads to provide the air blasts for preventing the spreading of the secondary combustion flames. The valve 98 may also be automatically operated from the control bar 85 so that the air from the air blasts will be turned on and off simultaneously with the turning on and off of the heating gas.

As mentioned above, a release of pressure in the remote control valve at the left hand end of plunger 90 will effect an opening of the duplex valves 83 for the heating gas supply and, since the valve 98 is also operated from the same control bar, such a release of pressure will also initiate the air blasts from the tubes 68 and 68a.

In order to bring about the desired release of pressure in the remote control valve 89, the left hand end of said remote control valve is connected by means of a conduit 100 to a differential valve mechanism, such as a pressure release valve 101 through two diametrically opposed ports 102 therein. As shown in Figs. 5 and 6, the pressure release valve 101 comprises a casing or housing 103 secured to a plate 104 which is slidably mounted upon a supporting plate 105 by means of headed pins 106 engaging in vertically disposed slots 107 provided in the supporting plate 105. A piston 108 having grooves 109 in the upper portion thereof is slidably mounted in the cylindrical casing 103. When this piston is in its lowermost position with respect to the housing 103, the ports 102 communicate with the grooves 109 to allow the fluid under pressure in the remote control valve 89 to be exhausted into the atmosphere. It will be understood that by providing two ports 102 on opposite sides of the piston 108 the pressure will be balanced on either side thereof and friction will be greatly reduced. As mentioned above, such a release of pressure in the remote control valve 89 will cause the duplex valves 83 and the air valve 98 to be opened so that the heating gases may pass to the heating heads and compressed air may pass to the tubes 68 and 68a. When, however, the piston 108 is moved to an upper position, the lower portion thereof will close the ports 102 to cause the pressure to again build up in the left hand end of the remote control valve 89 and thereby effect a closing movement in the air cylinder 86 to shut off the gas and air supplies through the duplex valves 83 and valve 98 respectively.

The supporting plate 105 for the pressure release valve 101 may be welded or otherwise secured to a vertically disposed channel member 110 which is pivotally connected, as at 111, to a vertical leg 112 of a special supporting frame 113. Said supporting frame 113 may be secured to the underside of the draw-bench plate 21 by means of screws or bolts 114. The member 110 is normally held in vertical position by means of a link 115 which is pivotally connected at 116 to said member 110 and at its other end is connected by means of a pivot 117 to a toggle lever 118. The toggle lever 118 is in turn pivoted at 119 to the vertical leg 112, and the lever and link 115 are resiliently held in a position slightly past dead center, as shown in Fig. 6, by means of a spring pressed plunger 120 bearing against the member 110 and tending to urge it in a direction away from the draw-bench D.

Actuation of the pressure release valve 101 is effected to turn on the gas supply for the heating heads as the skelp starts to pass between them, and then to turn off the gas supply after the entire length of skelp has passed through the welding and forming die. To this end a lever 122, pivoted by means of a pin 123 between two extended portions 124 of the member 110, extends partially over the upper surface of the draw-bench plate 21 to a position above the draw-chain 20. The end of the lever 122 which overlies the draw-chain 20 is provided with a pair of spaced arms 125 while the opposite end thereof is connected by means of a rod 126 with the slidable plate 104 associated with the pressure release valve 101. Also pivoted upon the pin 123 is a second lever 127 which has a downwardly extending bearing portion 128 at the right hand end thereof, as shown in Fig. 6, and at its opposite end is operatively connected by means of a rod 129 with the pressure relief valve piston 108. The right hand ends of the levers 122 and 127 are continuously and resiliently urged downwardly toward the draw-chain by means of helical springs 130 encircling each of the connecting rods 126 and 129, said springs bearing at their lower ends against a bearing plate 131 suitably secured to the member 110, and at their upper ends bearing against adjustable collars 132 provided on the connecting rods. Downward movement of the lever 122 is limited by means of an adjustable stop screw 133. Lever 127 has the right hand end thereof extending between the spaced arms 125 of the lever 122 and hence is limited in its downward movement by contact with said lever 122, while upward movement of the lever 127 may be limited by means of a stop pin 134 provided in the spaced arms 125.

The operation of the above described lever system for actuating the pressure relief valve is substantially as follows: Normally, both of the levers 122 and 127 are held in contact with the draw-bench plate 21 by means of the springs 130. When, however, a chain hook or dog 19 rides beneath the lower lever 122, both of said levers will be raised about the pivot pin 123. Such a simultaneous action of both levers will cause the valve housing 103 and piston 108 to move downwardly through the action of the connecting rods 126 and 129. Thus, there will be no relative movement between the piston and housing 103 and said piston will effectively keep the ports 102 closed. If, however, a skelp has been removed from the furnace and the tongs T are secured in the chain hook 19, then as the hook passes beneath the levers, both levers will be raised simultaneously and lever 122 will drop back to normal position when the hook passes; but lever 127 will be prevented from dropping to normal position since the bearing portion 128 thereof will contact the moving tongs, and later the moving newly formed tubing. This action of the levers will, in effect, cause the piston 108 to be moved downwardly with respect to the housing 103 and the parts will occupy the positions shown in Fig. 6. Hence the ports 102 will register with the grooved portions 109 of the piston 108 to allow the pressure in the remote control valve 89 to be released. Release of pressure in the remote control valve will in turn effect a turning on of the heating gas supply at the duplex valves 83, and the gaseous mixture of oxygen and fuel gas will flow out through the burner tips 53 and 57 to be ignited by a continuously burning pilot light or by the furnace heated skelp as it enters the lane L between the spaced heating heads 29. Simultaneously, the valve 98 will be opened to initiate the air blasts from the tubes 68, and 68a. Since it is only desired to turn on the gas and the air blasts when the skelp is entering the heating unit, it will be apparent that the distance between the entrance to said heating unit and the bearing portion 128 of the lever 127 will be approximately equal to the length of the tongs T. It will also be apparent that when the end of the formed tubing passes beneath the bearing portion 128 of the lever 127, said lever will drop to normal position and thereby move the piston 108 upwardly to close the ports 102. This will allow the pressure to build up again instantly in the left hand end of the remote control valve and cause the heating gas supply and the air supply for the tubes 68 and 68a to be shut off simultaneously. The heating gas supply and air supply for the air blasts will then remain shut off until the tongs T for the next heated skelp pass beneath the bearing portion of the lever 127.

Frequently when the heated skelp is being drawn through the spaced heating lanes it may become buckled or stuck or even may break or be torn apart as it is being drawn through the forming and welding die. When any of these conditions arises, it is desirable to shut off the heating gases and air promptly and remove the defective skelp as quickly as possible in order that production may not be delayed, and the skelp remaining in the furnace may not become overheated. To provide for this contingency, the levers 122 and 127 may be quickly moved to an inoperative position by depressing the toggle lever 118 to the dotted line position shown in Fig. 6. Such action will cause the vertically disposed member 110 to be moved about its pivot point 111 and thereby carry the levers 122 and 127 to a position where they will not contact the tongs or chain hooks. During such movement the lever 127 will be moved back to its normal position with respect to the lever 122 to cause a closing of the ports 102 and hence shut off the heating gas supply and the air blast. Thus, the operator may quickly remove the defective skelp and proceed with little delay.

Referring again to Fig. 8, it will be seen that cooling water may be supplied from any convenient source and passes through a manually operated valve 135 and into a pipe or conduit 136 which leads to a two-way drain cock valve 137 which may be mounted in the control box 72. A conduit 138 conducts the cooling water from the valve 137 to each of the blowpipes 71 and thence leads to the heating heads 29. After circulating through the passage 60 in each of the four head sections, the cooling water is returned through a conduit 139 to a second two-way drain cock valve 140. From the valve 140 the water may be conducted through a conduit 141 to a convenient drain or point of disposal, though it will be understood that said water may be circulated, cooled and reused, if desired.

Provision is made for automatically draining the heating heads and blowpipes of their cooling water when the apparatus is not in use. Thus, the operating handle 142 of each of the drain valves is pivotally connected to a control member 143 mounted on the piston rod of an air cylinder 144 which may be connected by a conduit 145 to the main air supply pipe or conduit 96. Hence, when the air valve 95 is opened, the control member 143 will be moved to the position shown in Fig. 8 where the valves 137 and 140 are opened to position to allow the cooling water to circulate through the blowpipes and heating heads and then pass to the drain or point of disposal. A helical spring 146 may be provided about the piston rod of the air cylinder 144 to move the control member 143 to the left when the air supply is shut off to thereby open the drain cocks in the valves 137 and 140 and allow the cooling water in the heating heads and blowpipes to drain.

All of the manually operated valves for the oxygen, acetylene, air and water may be mounted upon a control panel 147 and interconnected by means of a connecting bar 148 so that they may be opened or closed simultaneously by a main operating handle 149. The oxygen and acetylene regulators, 75 and 79 respectively, may also be mounted on the control panel which itself may be located at the benchman's platform (Fig. 1), where all of the control levers may be easily reached by him in an emergency. It will be apparent that when the main operating handle 149 at the benchman's platform is moved to position to turn on the heating gas, water and air supplies, oxygen and acetylene will pass through the system as far as the duplex control valves 83; compressed air will be supplied to the remote control valve 89 and air cylinder 86 so as to hold the duplex valves 83 in their closed position, and air will likewise be supplied to the air cylinder 144 to move the valves 137 and 140 to position where the cooling water may circulate through the blowpipes and heating heads and back to the source of supply. Thus, all of the automatic controls for the heating units will be in condition to be properly operated as the heated skelp passes between the spaced heating heads. When, however, the main operating handle 149 at the benchman's platform is moved to the closed position, all of the above mentioned automatic controls will be rendered inoperative.

In Figs. 10 and 11, there is shown a modified form of automatic control mechanism for the heating gas and compressed air supplies which is particularly adapted to be used when the draw-bench is operating at relatively high speed in the production of smaller sized pipe or tubing. That is, in this modified construction, the control levers may be positioned in closer relation to the auxiliary heating unit so as to turn on the gas supply more quickly. However, the set-up of the draw-bench bell-welding apparatus is the same as that described above and includes the draw-bench D having chain hooks 19 with which tongs T may be engaged to pull a heated skelp S from the furnace F through the auxiliary heating unit A and the forming and welding die B. Likewise, the control box 72 and the apparatus included therein is the same as that described above except that a modified form of remote control valve 150 is used to control the movements of the piston in the air cylinder 86.

Referring to Fig. 11, it will be seen that the modified remote control valve 150 comprises a cylindrical casing 151 having a double ended piston or plunger 152 mounted for reciprocatory movement therein and dividing the inner portion of the casing 151 into a left hand chamber 153 and a right hand chamber 154. The plunger 152 is adapted to slide longitudinally within the casing to connect an inlet port 155 with either of two outlet ports 156 or 157, which are connected with the lower and upper ends respectively of the air cylinder 86. When the piston 152 is in the left hand end of the casing, fluid under pressure will enter said casing through the inlet 155 and then pass through the outlet port 156 to the lower end of the air cylinder 86 to maintain the piston thereof in its upward position and hold the duplex valves 83 and the valve 98 closed. As the piston in cylinder 86 moves upwardly, the fluid expelled from the upper part of the cylinder is exhausted through port 157 in body 151 and out through an opening 158 to the atmosphere. When, however, the piston is in the right hand end of the casing, the fluid under pressure will pass out of the casing 151 through the outlet port 157 and to the upper end of the air cylinder 86 to move the piston thereof downwardly. This will open the duplex valves 83 and the valve 98 simultaneously and thereby turn on the gas supply for the auxiliary heating unit and the compressed air supply for the air blasts. In moving downwardly, the piston in cylinder 86 will expel the air before it from the lower cylinder port through a special exhaust passage 159 which is brought into registration with the outlet 156 when piston 152 is at the right. It may be noted at this point that the air cylinder 86 is so constructed that the piston thereof will stay in the last position to which it has been moved by the remote control valve until the pressure is applied, even momentarily, to change the position thereof, such a momentary change of pressure being sufficient to move the piston to the opposite end of the air cylinder 86 where it will remain until the pressure is subsequently changed.

By creating a difference in pressure in the chambers 153 and 154, at either end of the plunger 152, said plunger may be caused to slide from one end of the remote control valve to the other, at will. Thus, the chamber 153 is connected by means of an outlet port 160 and conduit 161 to a valve 162 which, when opened momentarily, is adapted to exhaust the fluid under pressure from the chamber 153 and thereby cause the plunger 152 to move to the left hand end of the casing 151. Likewise, the chamber 154 is connected through an outlet port 163 and conduit 164 to a first valve 165 which is connected in series through a conduit 166 with a second valve 167 so that the fluid in the chamber 154 will not be exhausted unless both the valves 165 and 167 are open at the same time. The plunger 152 is provided with a centrally disposed bleeder passage 168 of small diameter so that, when all of the valves 162, 165 and 167 are closed the fluid pressure within the remote control valve 150 will tend to be equalized on each side of the plunger 152. It will be apparent, however, that if the pressure is reduced in the chamber 154 by the simultaneous and momentary opening of the valves 165 and 167, the greater pressure in the chamber 153 will cause the piston 152 to move to the right, in which position the fluid under pressure will be transmitted through the outlet 157 to the top of the air cylinder 86 to cause the piston thereof to move downwardly and open the duplex valves 83 and valve 98. As stated above, the air cylinder piston will stay in the position in which the valves are opened until pressure is momentarily applied on the other side thereof to cause it to move back to its initial position. Thus, if the pressure in the chamber 153 is subsequently released by opening valve 162, after an equalization of the pressure within the casing 151, the plunger 152 will be moved to the left hand end of the casing and thereby cause the valves 83 and 98 to be closed.

As shown in Fig. 10, the valve 165 is mounted on the upper side of the draw-bench plate and is adapted to be actuated by a lever 169 when said lever is moved downwardly by the tongs T. The valve 167 may be mounted on the side of the draw-bench in any suitable manner and in alignment with the draw-chain 20 and may be opened by means of a lever 170 which is pivoted at 171 to the side of the draw-bench and below the valve 167. The lever 170 is arranged so that it will be moved in a counter-clockwise direction by contact of the chain hooks 19 therewith so as to open the valve 167. It will thus be seen that when a skelp S is removed from the furnace F and the tongs T are resting upon the lever 169 to open the valve 165, said tongs T will be in position to be engaged by the next chain hook 19 passing the end of the draw-bench. As this chain hook 19 contacts the lever 170 to open the valve 167, both valves 165 and 167 will be opened momentarily and thereby cause the desired reduction of pressure in the chamber 154 which will effect an opening of the duplex valves 83 and valve 98. When the draw-chain is moving rapidly, the tongs T will become engaged by the hook 19 which has opened the valve 167 and the gas in the auxiliary heating unit will be turned on by the time the heated skelp reaches the heating lane L to cause the burners to be lighted. It will be understood that, depending upon the speed of the draw-chain 20, the lever 170 may be arranged to be actuated by a draw-chain hook 19 any desired time before the tongs T are engaged by the same draw-chain hook.

In order to turn off the gases after the skelp has passed through the auxiliary heating unit, the valve 162 is adjustably mounted beneath the draw-bench in any convenient position and is adapted to be opened by means of a lever 172 which is pivoted thereon. The lower end of the lever 172 is connected by means of a helical spring 173 to the upper end of a lever 174 which is pivoted at 175 to a bracket 176 adjustably mounted on the underside of the draw-bench. The lever 174 is so positioned that, after the gases have been turned on as described above, the next draw-chain hook 19 which passes beneath the lever 174 will cause said lever to be moved in a counter-clockwise direction and thus effect an opening of the valve 162. This will reduce the previously balanced pressure in the chamber 153 and cause the air cylinder 86 to close the duplex valves 83 and valve 98. The bracket 176 is adjusted to such a position beneath the draw-bench that the lever 174 will be actuated at the time the skelp reaches the exit end of the auxiliary heating unit so that the heating gases and the compressed air supply will be shut off at the proper time.

It has been found in practice that cinder tends to collect on the lower edges of the highly heated skelp as it passes through the auxiliary heating unit. This is undesirable since it forms hard ridges of slag on the inside of the tubing after the skelp has passed through the forming and welding die B. In order to remove such collected cinder or slag before the skelp passes through the bell B, an auxiliary air blast block 178 may be provided adjacent the left hand end of the auxiliary heating unit A, as shown in Fig. 10. This air blast block 178, which is shown in section in Fig. 12, is similar in shape to the supporting members 36 and is provided with a central passage 179 which may be connected by means of a conduit 180 with one of the conduits supplying the air blast tubes 68 and 68a. Extending upwardly and at an angle from the central passage 179 are a plurality of passages 181 which are arranged to direct their jets of compressed air upon the lower edges of the skelp and remove any accumulated cinder or slag therefrom. Thus, all tendency for slag ridges to form on the inside of the tubing is removed.

If desired, a special air blast nozzle 182 may be provided at any convenient location beneath the auxiliary heating unit A, such as shown in Fig. 10, and arranged to direct a blast or jet of air toward or into the welding die B. Such a jet of air thus provides aspirating means for directing the hot reducing gases surrounding the heated skelp into the space between the heating unit and the welding die and into the formed tubing to reduce or prevent oxidation on the inside of the tubing.

Difficulty is encountered in welding some types of furnace heated skelp, such as those composed of high carbon or special alloy steel, due to the presence of tenacious oxide upon the edges thereof. If the edges of such skelp are heated sufficiently high to melt the oxide with a view toward forcing the thus melted oxide from the edges by the pressure of the welding operation, such edge portions will become greatly overheated and inferior or imperfect welds will result. Thus, in order to obtain a successful weld with such skelp it is desirable to remove the oxide from the edges thereof before the welding operation. This may be accomplished either by applying a flux to the edges so as to wash the oxide away, or by scraping the oxide from the edges by some mechanical means before the skelp passes into the auxiliary heating unit. Then the reducing atmosphere of the auxiliary heating unit will prevent any subsequent oxidation. It will be noted that the air jet from the nozzle 182, described above, will deflect the burned gases toward the welding bell B and thereby prevent further oxidation between the heating unit and the welding die; or if desired, auxiliary jets of a reducing gas, such as acetylene, may be played upon the heated skelp edges in this space.

In Fig. 14 there is shown one form of mechanical scraping device which is constructed in accordance with the principles of the present invention and which may be utilized for practicing the above method of welding skelp. As shown in this figure, the scraping devices R for removing oxide from the edges of the skelp may comprise supporting arms 184 pivotally mounted at 185 on a special ribbed support 186 which takes the place of the supports 36 for supporting the skelp as it passes through the heating lane L. Each arm is provided with an upwardly sloping flange 187 on the upper end thereof, similar to the portions 40' shown in Fig. 13, for preventing the skelp from rising and aiding in guiding it into the heating lane. A groove 188 is formed on the inner side of each arm 184 to receive a scraping blade or knife 189 which may be vertically adjustable in the groove so as to present a new portion of the blade as it wears, and laterally adjustable for controlling the depth of cut made. The blades are resiliently urged inwardly toward the edges of the skelp by a spring 190 which bears against the inner face of each arm 184 below the pivot and is mounted on a rod 191. The ends of the rod 191 are received in openings provided in the arms and said rod thereby limits the outward pivotal movement of the arms so that they may act as lateral edge guides and prevent the skelp from coming in contact with the protective plates 61. Inward pivotal movement of the arms is limited by a stop member 192 mounted on the end of the support 186 and located above the pivot points 185. The movement of the arms is thus only sufficient to provide for production variations in the skelp width. Since the spring 190 and rod 191 are located in a region of intense heat, it may be desirable to use a water cooled plunger in lieu thereof. Moreover, other oxide-removing devices, such as self-cleaning rotary blades, may be used in place of the blades 189. It will be apparent that by means of the above described scraping mechanism, oxide may be removed from the edges of the furnace heated skelp so that it may be more efficiently welded upon passing through the auxiliary heating unit and the forming and welding die.

It will be understood that, if desired, the air cylinder 86 may be provided with a spring to move the piston to a position in which the duplex control valves 83 will be opened, and that the pressure release valve 101 may be connected directly to the air cylinder 86 so that upon a release of pressure in said air cylinder such a spring would effect the required movement of the control bar 85 to open the valves 83. Moreover, instead of employing air blasts to keep the secondary flames in the heating unit from interfering with the operator, a movable shield may be mounted over the heating unit and swung to operative position when the heated skelp is passing through said heating unit.

Various other changes may be made in the construction and certain features thereof may be employed without others without departing from the present invention or sacrificing any of its advantages.

What is claimed is:

1. A method of heating an exposed edge of a workpiece to be conditioned for seam welding, said edge having a side of finite width, which comprises the steps of directing converging rows of high temperature heating flames to impinge against the side of said edge so as to concentrate the heat in the central region of said side; and directing additional combustion supporting gas between the converging rows of flames.

2. A method of heating an exposed edge of a workpiece to be conditioned for seam welding, said edge having a side of finite width, which comprises directing converging rows of heating flames to impinge against the side of said edge and in such a manner that the converging rows of flames intersect approximately at the edge of the workpiece so as to concentrate the heat in the central region of said edge; said rows being relatively adjustable toward and away from each other to allow for variations in the thickness of the workpiece; and directing gas including oxygen between the converging rows of heating flames and substantially at their line of intersection so as to aid further in combustion.

3. In the manufacture of tubing from flat strip material, the method of heating the lateral edges of such material to the welding temperature which comprises directing converging heating flames against both lateral edges of the strip simultaneously so as to concentrate the heat in the region of said edges; and moving the strip and heating flames relatively to one another in a direction substantially parallel to said edges.

4. In the manufacture of tubing from flat strip material, the method of heating the lateral edges of such material to the welding temperature which comprises directing converging rows of high temperature heating flames against both lateral edges of such flat strip simultaneously and in such a manner that the converging rows of flames intersect approximately at the edges of the strip so as to concentrate the heat in the region of the edges; and moving said strip and said converging and intersecting heating flames relatively to one another.

5. In the manufacture of tubing from flat strip material, the method of heating the lateral edges of such material to the welding temperature which comprises directing converging heating flames against both lateral edges of the strip simultaneously so as to concentrate the heat in the region of said edges; supplying additional combustion supporting gas between the converging heating flames; and moving the strip and heating flames relatively to one another in a direction substantially parallel to said edges.

6. In the manufacture of tubing from flat strip material, the method of heating the lateral edges of such material to the welding temperature which comprises directing converging rows of high temperature heating flames against both lateral edges of such flat strip simultaneously and in such a manner that the converging rows of flames intersect approximately at the edges of the strip so as to concentrate the heat in the region of the edges; supplying gas including oxygen between each of the converging rows of heating flames and substantially at their line of intersection so as to aid further in combustion; and moving said strip and said converging and intersecting heating flames relatively to one another.

7. In the manufacture of tubing from flat strip material, the method of heating the lateral edges of such material to the welding temperature which comprises directing converging heating flames against both lateral edges of the strip simultaneously so as to concentrate the heat in the region of said edges; applying a protective dense blanket of gas in sufficient proximity to the top side of the strip to inhibit the rise of the heating flames; and moving the strip and heating flames relatively to one another in a direction substantially parallel to said edges.

8. In the manufacture of tubing from flat strip material, the method of heating the lateral edges of such material to the welding temperature which comprises directing converging rows of high temperature heating flames against both lateral edges of such flat strip simultaneously and in such a manner that the converging rows of flames intersect approximately at the edges of the strip so as to concentrate the heat in the region of said edges; supplying gas including oxygen between each of the converging rows of heating flames and substantially at their line of intersection so as to aid further in combustion; applying a protective dense blanket of gas in sufficient proximity to the top side of the strip to inhibit the rise of the heating flames; and moving said strip and said converging rows of intersecting heating flames relatively to one another.

9. In apparatus for heating at least one exposed lateral edge of a metal member which is to be seam welded, said edge having a side of finite width, the combination of means for applying converging rows of high temperature heating flames against the side of such lateral edge and in such a manner that the converging rows of flames intersect approximately at such side; and means for moving said heating means and metal member relatively to one another.

10. In apparatus for heating at least one exposed lateral edge of a metal member which is to be seam welded, said edge having a side of finite width, the combination of means for applying converging rows of high temperature heating flames against the side of such edge; means for directing additional combustion supporting gas between said converging heating flames; and means for moving said heating means and metal member relatively to one another.

11. In apparatus for heating at least one edge of a metal member which is to be seam welded, the combination of means for applying converging rows of high temperature heating flames against such edge; means for supplying additional combustion supporting gas between the converging rows of heating flames; and means for applying a protective dense blanket of gas in sufficient proximity to the top side of the metal member so as to inhibit the rise of the heating flames.

12. In apparatus for heating at least one edge of a metal member which is to be seam welded, the combination of a heating head having heating flame orifices in one face thereof; and a protective plate mounted between such face of the heating head and the metal member which is to be heated.

13. In apparatus for heating the lateral edges of strip material, the combination of spaced heating heads each having a plurality of orifices in one face thereof which are arranged to direct their flames upon the lateral edges of the strip material; and a protective plate mounted between such face of each of said heads and the strip material which is to be heated.

14. In an apparatus for manufacturing metal tubes from skelp, the combination of spaced heating heads for heating the lateral edges of the skelp, said heating heads including a plurality of removable individual flame tips which are arranged to direct their flames upon the edges of the skelp as it passes between said spaced heating heads; and means for protecting such tips from the accumulation of slag.

15. In an apparatus for manufacturing metal tubes from skelp, the combination of spaced heating heads for heating the lateral edges of the skelp, said heating heads comprising upper and lower sections each including a plurality of removable individual flame tips which are arranged to direct their flames upon the edges of the skelp as it passes between said spaced heating heads; and means for adjusting said sections and said spaced heating heads to accommodate skelp of different thicknesses and widths.

16. In an apparatus for manufacturing metal tubes from skelp, the combination of spaced heating heads for heating the lateral edges of the skelp, said heating heads including a plurality of removable tips which are arranged to direct their flames upon the edges of the skelp as it passes between said spaced heating heads; and transparent means for confining the flames from such tips to the space between the heating heads so that they will not spread and interfere with the operator.

17. In an apparatus for manufacturing metal tubes from skelp, the combination of spaced heating heads for heating the lateral edges of the skelp, said heating heads including a plurality of removable tips which are arranged to direct their flames upon the edges of the skelp as it passes between said spaced heating heads; and a protective plate mounted over the face of each of said heating heads and having openings therein through which the flames from the removable tips may pass.

18. In an apparatus for manufacturing metal tubes from skelp, the combination of spaced heating heads for heating the lateral edges of the skelp, said heating heads including a plurality of removable tips which are arranged to direct their flames upon the edges of the skelp as it passes between said spaced heating heads; a protective plate mounted over the face of each of said heating heads and having openings therein through which the flames from the removable tips may pass; and means for guiding the skelp as it passes between said spaced heating heads so as to maintain said skelp at a fixed distance from said protective plates.

19. In apparatus for manufacturing metal tubes from skelp, the combination of spaced heating heads for raising the temperature of the lateral edges of the skelp, each of said heads including upper and lower rows of oxy-fuel gas burners which are adapted to direct their flames upon the skelp edges; and means for adjusting the distance between the upper and lower rows of burners so as to accommodate skelp of different thicknesses.

20. In apparatus for manufacturing metal tubes from skelp, the combination of spaced heating heads for raising the temperature of the lateral edges of the skelp, each of said heads including upper and lower rows of oxy-fuel gas burners which are adapted to direct their flames upon the skelp edges; means for adjusting the distance between the upper and lower rows of burners so as to accommodate skelp of different thicknesses; and means for directing an air blast into the space between the heating heads so as to prevent the flames from spreading about the heating heads.

21. Apparatus for raising the temperature of the lateral edges of skelp comprising a support; spaced heating heads mounted on said support and each including upper and lower rows of oxy-fuel gas burners which are adapted to direct their flames upon the skelp edges so as to raise the temperature thereof; and means for adjusting the distance between the upper and lower rows of burners so as to accommodate skelp of different thicknesses.

22. Apparatus for raising the temperature of the lateral edges of skelp comprising a support; spaced heating heads mounted on said support and each including upper and lower heating sections; a plurality of tips mounted in each of said head sections and so arranged as to direct their flames upon the lateral edges of the skelp as it passes between said spaced heating heads; means for adjusting the space between said heating heads for accommodating skelp of different widths; and means for adjusting the space between the upper and lower sections of each head so as to vary the area which will be heated by said tips.

23. Apparatus for raising the temperature of the lateral edges of skelp comprising a support; spaced heating heads mounted on said support and each including upper and lower heating sections; a plurality of tips mounted in each of said head sections and so arranged as to direct their flames upon the lateral edges of the skelp; means for adjusting the space between the upper and lower sections of each head; and means for protecting the tips in each head section from the accumulation of slag.

24. In apparatus for forming a seam weld in each of successive workpieces, the combination of heating means comprising a plurality of oxy-fuel gas burners for applying high temperature heat to the workpiece, means for moving said heating means and said workpiece relatively to one another to highly heat a laterally localized region seamwise of said workpiece; and mechanism automatically operable to control said heating means and adapted to interrupt the latter when the heating of one workpiece is completed and to restore said heating means when the heating of the next workpiece is to be initiated; said mechanism comprising valves for controlling the supply of oxygen and fuel gas to said heating means; a lever adapted to be held in raised position by the workpieces as they move relatively thereto; and means actuated by said lever for opening said valves and maintaining them in open position while said lever is in such raised position.

25. In apparatus for manufacturing metal tubes from skelp and including a draw-bench having draw-chain hooks with which tongs may be connected for drawing the skelp through a forming and welding die, the combination of an oxy-fuel gas heating unit through which the skelp is adapted to be drawn so that the lateral edges thereof may be heated to the welding temperature; and means for automatically turning on the gases for the heating unit only when a skelp is being drawn therethrough by the mechanism of said draw-bench, said means comprising a differential valve mechanism adapted to be positioned by each draw-chain hook for operation by a tong connected thereto.

26. In apparatus for manufacturing metal tubes from skelp and including a draw-bench having draw-chain hooks with which tongs may be connected for drawing the skelp through a forming and welding die, the combination of an oxy-fuel gas heating unit through which the skelp is adapted to be drawn so that the lateral edges thereof may be heated to the welding temperature; valves for controlling the supply of oxygen and fuel gas to said heating unit; a lever mounted on said draw-bench and adapted to be held in a raised position by the tongs or skelp as they are passing over the draw-bench; and means actuated by said lever for opening said valves and maintaining them in an open position while said lever is in such raised position.

27. In apparatus for manufacturing metal tubes from skelp and including a draw-bench having draw-chain hooks with which tongs may be connected for drawing the skelp through a forming and welding die, the combination of an oxygen-fuel gas heating unit through which the skelp is adapted to be drawn so that the lateral edges thereof may be heated to the welding temperature; valves for controlling the supply of oxygen and fuel gas to said heating unit; a lever normally resting across the surface of the draw-bench and adapted to be raised and lowered as the draw-chain hooks pass beneath said lever; a second lever adjacent said first lever and adapted to be raised by said first lever and held in raised position by the tongs or formed tubing as they are passing over the draw-bench; and means actuated by said levers for opening said valves only when said first lever is in its normal lowered position and said second lever is in its raised position.

28. In apparatus for manufacturing metal tubes from skelp and including a draw-bench having draw-chain hooks with which tongs may be connected for drawing the skelp through a forming and welding die, the combination of an oxygen-fuel gas heating unit through which the skelp is adapted to be drawn so that the lateral edges thereof may be heated to the welding temperature; valves for controlling the supply of oxygen and fuel gas to said heating unit; a lever normally resting across the surface of the draw-bench and adapted to be raised and lowered as the draw-chain hooks pass beneath said lever; a second lever adjacent said first lever and adapted to be raised by said first lever and held in raised position by the tongs or formed tubing as they are passing over the draw-bench; means actuated by said levers for opening said valves only when said first lever is in its normal lowered position and when said second lever is in its raised position; and means for quickly moving both of said levers to an inoperative position.

29. In an apparatus for manufacturing metal tubes from skelp, the combination of spaced heating heads for heating the lateral edges of the skelp, said heating heads including a plurality of nozzles which are adapted to direct oxy-fuel gas flames upon the edges of the skelp as it passes between said heating heads; means for forming the heated skelp into tubing; and aspirating means for directing the hot reducing gases surrounding the heated skelp into the newly formed tubing to reduce oxidation on the inside of said tubing.

30. In apparatus for preparing at least one edge of a metal member which is to be seam welded, the combination of means for heating said edge, mechanical scraping means for removing oxide from said edge, and means for heating such edge to the welding temperature.

31. A method of manufacturing tubing from metal strip which comprises, heating the strip to a temperature at which it will be pliable; mechanically removing oxide from the edges of the heated strip; heating such cleaned edges to the welding temperature; and bending the strip into tubular form and forcing the thus prepared edges together.

32. In the manufacture of tubing from furnace heated flat metal skelp, the steps of continuously scraping oxide from the edges of the hot skelp; heating such cleaned edges to the welding temperature; and passing the skelp through a forming and welding die to unite such edges.

33. Welding apparatus comprising in combination: means acting to move a common surface of work pieces in a predetermined path through a weld preparation station; and a battery of weld preparation jets at said station acting to impinge upon the surface of the work traversing said path; said jets being disposed in series in two inclined planes which intersect substantially at the longitudinal center line of said path; the jets in one plane being arranged between the jets in the other plane; the arrangement being such that the desired effect of the jets is concentrated on that surface of the work moving along said path.

34. Apparatus for heating the edges of hot skelp prior to seam welding the same, comprising spaced plate means between which the hot skelp passes, said plate means having port means adjacent the skelp path; and removable individual flame tip means associated with each port means for projecting flame therethrough and against the skelp edge.

35. Apparatus for making pipe of skelp, comprising the combination with means acting to progressively curl the skelp and weld the opposite edges thereof; of means for thermo-chemically treating such edges prior to their being welded; and individual jet or blast means for causing gas resulting from such treatment to enter and travel through the inside of the newly formed tube for the purpose of controlling oxidation therein.

36. In the manufacture of welded pipe and tubing from furnace-heated skelp by passing the heated skelp through a forming bell die, the steps which comprise first mechanically removing oxide from the opposite edges of the hot skelp as it comes from the heating furnace, and then heating said edges in a reducing atmosphere for subsequent seam welding in said forming bell die.

37. In apparatus for heating at least one edge of a metal member, the combination of a heating head having heating flame orifices in one face thereof; and a protective plate of material to which slag will not readily adhere, mounted between said face and the metal member to be heated.

38. In apparatus for heating at least one edge of a metal member, the combination of a heating head having heating flame orifices in one face thereof; and a protective plate having apertures registering with the flame orifices in said face, mounted between said face and the metal member to be heated.

39. Apparatus for making pipe of skelp, comprising the combination with means acting to progressively curl the skelp and weld the opposite edges thereof; of means for thermo-chemically treating such edges prior to their being welded; a nozzle located between such skelp curling and welding means and such thermo-chemical treating means, for directing an air blast toward such skelp curling and welding means for causing gas resulting from such treatment to travel through the inside of the newly formed tube for the purpose of controlling oxidation therein.

HOMER W. JONES.
ALFRED J. MILLER.